(12) United States Patent
Huang

(10) Patent No.: US 12,111,866 B2
(45) Date of Patent: Oct. 8, 2024

(54) TERM WEIGHT GENERATION METHOD, APPARATUS, DEVICE AND MEDIUM

(71) Applicant: Tencent Technology (Shenzhen) Company Limited, Shenzhen (CN)

(72) Inventor: Jianhui Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 161 days.

(21) Appl. No.: 17/975,519

(22) Filed: Oct. 27, 2022

(65) Prior Publication Data

US 2023/0057010 A1  Feb. 23, 2023

Related U.S. Application Data

(63) Continuation of application No. PCT/CN2022/078183, filed on Feb. 28, 2022.

(30) Foreign Application Priority Data

Mar. 9, 2021 (CN) .......................... 202110258046.3

(51) Int. Cl.
*G06F 7/00* (2006.01)
*G06F 16/71* (2019.01)
(Continued)

(52) U.S. Cl.
CPC .......... *G06F 16/7844* (2019.01); *G06F 16/71* (2019.01); *G06V 10/761* (2022.01);
(Continued)

(58) Field of Classification Search
CPC .... G06F 16/7844; G06F 16/71; G06F 40/258; G06F 40/279; G06V 10/806; G06V 30/1918; G06V 20/46; G06V 10/761; G06V 30/153; G06V 30/18; G06V 10/82; G06V 20/41; G06V 10/764; G06V 20/635; G06N 3/045; G06N 3/08
(Continued)

(56) References Cited

U.S. PATENT DOCUMENTS

2016/0261850 A1\*  9/2016  Debevec ................ G06V 40/16
2016/0335260 A1\*  11/2016  Convertino ......... G06F 16/2358
2017/0177708 A1   6/2017  Zhao et al.

FOREIGN PATENT DOCUMENTS

CN    109635081 A    4/2019
CN    110781347 A    2/2020
(Continued)

OTHER PUBLICATIONS

Tencent Technology, WO, PCT/CN2022/078183, May 10, 2022, 5 pgs.
(Continued)

*Primary Examiner* — Md I Uddin
(74) *Attorney, Agent, or Firm* — Morgan, Lewis & Bockius LLP

(57) ABSTRACT

A term weight determination method includes: obtaining a video and video-associated text, the video-associated text including at least one term; generating a halfway vector of the term by performing multimodal feature fusion on the features of the video, the video-associated text and the at least one term; and generating the weight of the at least one term based on the halfway vector of the at least one term.

19 Claims, 7 Drawing Sheets

(51) Int. Cl.
*G06F 16/783* (2019.01)
*G06V 10/74* (2022.01)
*G06V 10/764* (2022.01)
*G06V 10/80* (2022.01)
*G06V 10/82* (2022.01)
*G06V 20/40* (2022.01)
*G06V 30/148* (2022.01)
*G06V 30/18* (2022.01)
*G06V 30/19* (2022.01)

(52) U.S. Cl.
CPC .......... *G06V 10/764* (2022.01); *G06V 10/806* (2022.01); *G06V 10/82* (2022.01); *G06V 20/41* (2022.01); *G06V 20/46* (2022.01); *G06V 30/153* (2022.01); *G06V 30/18* (2022.01); *G06V 30/1918* (2022.01)

(58) Field of Classification Search
USPC ........ 707/706, 736, 748, 758, 999.101, 732, 707/999.01, 999.001, E17.028
See application file for complete search history.

(56) References Cited

FOREIGN PATENT DOCUMENTS

| | | | | |
|---|---|---|---|---|
| CN | 111241811 A | | 6/2020 | |
| CN | 111581437 A | | 8/2020 | |
| CN | 111767461 A | | 10/2020 | |
| CN | 111988668 A | | 11/2020 | |
| CN | 113010740 A | | 6/2021 | |
| CN | 113395594 A | * | 9/2021 | ......... H04N 21/4668 |
| CN | 110456985 B | * | 5/2023 | ........... G06F 3/0604 |
| CN | 111444357 B | * | 10/2023 | ........... G06F 16/435 |

OTHER PUBLICATIONS

Tencent Technology, IPRP, PCT/CN2022/078183, Sep. 12, 2023, 6 pgs.
Tencent Technology, ISR, PCT/CN2022/078183, May 10, 2022, 3 pgs.

* cited by examiner

TERM WEIGHT GENERATION METHOD, APPARATUS, DEVICE AND MEDIUM

CROSS-REFERENCE TO RELATED APPLICATIONS

This application is a continuation application of PCT Patent Application No. PCT/CN2022/078183, entitled "METHOD, APPARATUS, APPARATUS AND MEDIUM FOR GENERATING WORD WEIGHTS" filed on Feb. 28, 2022, which claims priority to Chinese Patent Application No. 202110258046.3, filed with the State Intellectual Property Office of the People's Republic of China on Mar. 9, 2021, and entitled "TERM WEIGHT GENERATION METHOD, APPARATUS, DEVICE AND MEDIUM", all of which are incorporated herein by reference in their entirety.

FIELD OF THE TECHNOLOGY

This application relates to the field of information processing, and in particular relates to a term weight generation method, apparatus, device and medium.

BACKGROUND OF THE DISCLOSURE

A video title is text information used for describing the video content of a video. In a video search system, it is necessary to pre-extract the weight of each term in the video title based on understanding of the semantics of the video content, so as to facilitate the subsequent video search process. For example, the higher the weight of a certain term in the video title, the higher the degree of association between the term and the video content, hence the higher the importance of the term during search.

In the related art, a term weight generation method is mainly to encode a sentence in a video title and each term in the video title respectively to obtain a sentence vector and term vectors. Then, feature fusion is performed on the encoded sentence vector and term vectors to obtain a fusion vector, and binary classification judgment is performed on the fusion vector to determine whether the current term is a core term, and then output the weight of the current term.

The term weights generated by the above method are inaccurate in some cases. For example, if a video title is "Double-click this video, you will find that it is easier to roast pork than roast fish.", it is difficult to make a strong distinction between the weights of "roast pork" and "roast fish" by the above method.

SUMMARY

This application provides a term weight generation method, apparatus, device and medium, which may improve the accuracy and reliability of term weights by incorporating image feature information of a video. The technical solutions are as follows:

According to an aspect of this application, a term weight generation method is provided, performed by a computer device, and including the following steps:
  obtaining a video and video-associated text, the video-associated text including at least one term, and the video-associated text being text information associated with the content of the video;
  generating a halfway vector of the at least one term by performing multimodal feature fusion on features of the video, the video-associated text and the at least one term; and
  generating a weight of the at least one term based on the halfway vector of the at least one term.

According to an aspect of this application, a term weight generation apparatus is provided, including:
  an obtaining module, configured to obtain a video and video-associated text, the video-associated text including at least one term, and the video-associated text being text information associated with the content of the video; and
  a generation module, configured to perform multimodal feature fusion on the features of three types of information, e.g., the video, the video-associated text and the at least one term, to generate a halfway vector of the at least one term;
  the generation module being further configured to generate the weight of the at least one term based on the halfway vector of the at least one term.

In an embodiment, the generation module includes an extraction module and a fusion module.

In an embodiment, the extraction module is configured to extract a video feature vector of the video, extract a text feature vector of the video-associated text, and extract a term feature vector of the at least one term.

In an embodiment, the fusion module is configured to fuse the video feature vector, the text feature vector and the term feature vector to obtain the halfway vector of the at least one term.

In an embodiment, the fusion module includes a first fusion submodule and a second fusion submodule.

In an embodiment, the first fusion submodule is configured to perform a first fusion operation on the video feature vector, the text feature vector and the term feature vector to obtain a first fusion vector.

In an embodiment, the second fusion submodule is configured to perform a second fusion operation on the first fusion vector and the term feature vector to obtain the halfway vector of the at least one term.

In an embodiment, the first fusion submodule includes a first splicing module and a first mapping module.

In an embodiment, the first splicing module is configured to sequentially splice the video feature vector, the text feature vector and the term feature vector to obtain a first splicing vector.

In an embodiment, the first mapping module is configured to perform fully connected feature mapping on the first splicing vector to obtain the first fusion vector.

In an embodiment, the second fusion submodule includes a second splicing module and a second mapping module.

In an embodiment, the second splicing module is configured to sequentially splice the first fusion vector and the term feature vector to obtain a second splicing vector.

In an embodiment, the second mapping module is configured to perform fully connected feature mapping on the second splicing vector to obtain the halfway vector of the at least one term.

In an embodiment, the generation module further includes a transformation module.

In an embodiment, the transformation module is configured to perform dimension transformation on the halfway vector to obtain a one-dimensional vector.

In an embodiment, the transformation module is further configured to normalize the one-dimensional vector to obtain the weight of the at least one term.

In an embodiment, the transformation module is configured to transform the one-dimensional vector by a threshold function to obtain the weight of the at least one term.

In an embodiment, the extraction module includes a video extraction module, a text extraction module and a term extraction module, the video extraction module including a framing module, an extraction submodule and a computation module.

In an embodiment, the framing module is configured to perform a framing operation on the video to obtain at least two video frames.

In an embodiment, the extraction submodule is configured to extract video frame vectors of the at least two video frames.

In an embodiment, the computation module is configured to compute the average vector of the video frame vectors of the at least two video frames, and determine the average vector as the video feature vector; or, compute a weighted vector of the video frame vectors of the at least two video frames, and determine the weighted vector as the video feature vector.

In an embodiment, the computation module is configured to:
determine a target object included in each video frame by a target detection model;
classify the target object by a classification model to obtain the target object classification corresponding to each video frame;
compute the similarity score between the target object classification and the term corresponding to each video frame;
determine the weight of the video frame vector of each video frame according to the similarity score corresponding to each video frame, the weight being positively correlated to the similarity score; and
compute the weighted vector of the video frame vectors of the at least two video frames according to the video frame vectors of the at least two video frames and the respective weights of the video frame vectors of the at least two video frames, and determine the weighted vector as the video feature vector.

In an embodiment, the extraction submodule is further configured to call a residual network to extract the video frame vectors of the at least two video frames in the video.

In an embodiment, the text extraction module is configured to call a bidirectional encoder representation from transformers (BERT) network to extract the text feature vector of the video-associated text, or call a long short-term memory (LSTM) network to extract the text feature vector of the video-associated text.

In an embodiment, the term extraction module includes a term segmentation module and a term extraction submodule.

In an embodiment, the term segmentation module is configured to segment the video-associated text to obtain terms.

In an embodiment, the term extraction submodule is configured to call a deep neural network to extract the term feature vector of the term.

In an embodiment, the term segmentation module is further configured to call a Chinese term segmentation tool to segment the video-associated text to obtain terms.

In an embodiment, the extraction module is configured to:
extract the video frame vector based on the video frame in the video;
extract an audio frame vector based on an audio frame in the video;
extract a text screen vector based on the text in the video frame; and
fuse at least two of the video frame vector, the audio frame vector and the text screen vector to obtain the video feature vector.

According to an aspect of this application, a computer device is provided, including: a processor and a memory, the memory storing a computer program, and the computer program being loaded and executed by the processor to implement the term weight generation method according to the above.

According to another aspect of this application, a computer-readable storage medium is provided, storing a computer program, and the computer program being loaded and executed by a processor to implement the term weight generation method according to the above.

According to another aspect of this application, a computer program product or a computer program is provided, including computer instructions, and the computer instructions being stored in a computer-readable storage medium. A processor of a computer device reads the computer instructions from the computer-readable storage medium, and executes the computer instructions, causing the computer device to implement the term weight generation method according to the above.

Beneficial effects brought by the technical solutions provided in the embodiments of this application are at least as follows:

By combining multi-dimensional features of a video, video-associated text and a term, a halfway vector is generated, and based on the halfway vector, the weight of the term is generated. In a video search process, the above term weight generation method is used for pre-extracting the weight of a term, which not only considers the feature of the text dimension, but also incorporates and fuses the feature of the video dimension. The term weight generation based on multi-dimensional features is conducive to improving the accuracy and reliability of the outputted term weight, and improving the distinction between key terms and confusing terms in video-associated text.

DESCRIPTION OF EMBODIMENTS

Figure 1:
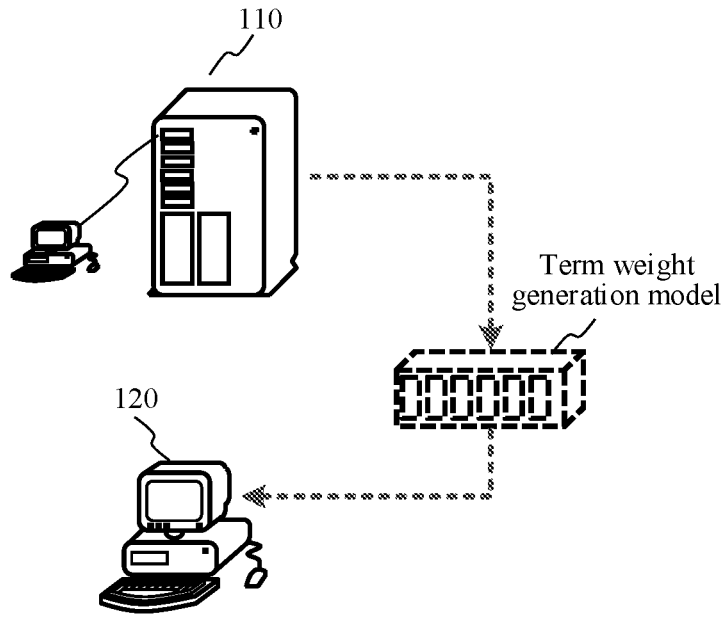
FIG. 1 is a schematic diagram of a term weight generation system provided according to an exemplary embodiment.

First, nouns described in embodiments of this application are briefly introduced.

Term Importance: It refers to how much a term contributes to the meaning of a sentence. Commonly, a complete sentence includes a subject, a predicate, an object, an attribute, an adverbial and a complement. Exemplarily, in a sentence "Double-click this video, you will find that it is easier to roast pork than roast fish.", after conjunctions and personal pronouns are removed, the sentence mainly includes the terms "double-click", "video", "find", "roast pork", "roast fish", and "easier". Based on the understanding of the overall meaning of the sentence, it is easy to get that "roast pork" and "roast fish" play a key role in the meaning of the sentence. Specifically, "roast pork" contributes more to the meaning of the sentence than "roast fish", that is, the importance of the term "roast pork" is higher than that of the term "roast fish".

In an embodiment, the weight of a term in a sentence is used for representing the importance of the term. Illustratively, in the above sentence, the weight of "roast pork" is 0.91, and the weight of "roast fish" is 0.82, that is, by comparing the weights, it may be concluded that "roast pork" is more important than "roast fish".

Residual Network (ResNet): A deep learning-based feature extraction neural network. In traditional deep learning, on the premise that a neural network may converge, as the network depth increases, the performance of the network first gradually increases to saturation, and then decreases rapidly, known as the problem of network degradation. In traditional deep learning, there is also a gradient diffusion problem. The residual network adds an identity map to a deep learning neural network, and solves the network degradation problem and gradient diffusion problem.

In this application, a residual network is configured to transform an image into a computable mathematical language. Exemplarily, the residual network transforms a video frame into a video frame vector, where the video frame vector contains information reflecting the content of the video frame, that is, the video frame vector may replace the video frame.

Bidirectional Encoder Representations from Transformers (BERT): A sentence transformation model, capable of transforming abstract text in the real world into vectors operable by a mathematical formula. In an embodiment, the BERT transforms inputted text into a text vector, where the text vector contains information reflecting the content of the text, that is, the text vector may replace the text.

Deep Neural Network (DNN): A multi-layer neural network with a fully connected neuron structure, capable of transforming objective things in the real world into vectors operable by a mathematical formula. In an embodiment, the DNN transforms an inputted term into a term vector, where the term vector contains information reflecting the content of the term, that is, the term vector may replace the term.

Threshold Function: Used for realizing transformation of numerical intervals, for example, by a threshold function, a number x in an interval [0, 100] is transformed to a number y in an interval [0, 1]. By a sigmoid function (a threshold function), a one-dimensional vector may be mapped to a number on the interval [0, 1]. In this application, a term weight is obtained by mapping a one-dimensional vector to the interval [0, 1].

The solution of the embodiments of this application includes a model training stage and a term weight prediction stage. FIG. 1 is a schematic diagram of a term weight generation system shown according to an exemplary embodiment. As shown in FIG. 1, in the model training stage, a model training device 110 trains a term weight generation model with high accuracy by means of a preset training sample set; and in the term weight prediction stage, a term weight prediction device 120 predicts the weights of terms in the text according to the trained term weight generation model and inputted video and text.

The model training device 110 and the term weight prediction device 120 may be computer devices with machine learning capabilities, for example, the computer devices may be terminals or servers.

In some embodiments, the model training device 110 and the term weight prediction device 120 may be the same computer device; alternatively, the model training device 110 and the term weight prediction device 120 may be different computer devices. Moreover, when the model training device 110 and the term weight prediction device 120 are different devices, the model training device 110 and the term weight prediction device 120 may be the same type of device, for example, the model training device 110 and the term weight prediction device 120 may both be servers; or, the model training device 110 and the term weight prediction device 120 may be different types of devices. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch and the like, but is not limited thereto. The terminal and the server may be directly or indirectly connected in a wired or wireless communication manner. This is not limited in this application.

Figure 2:
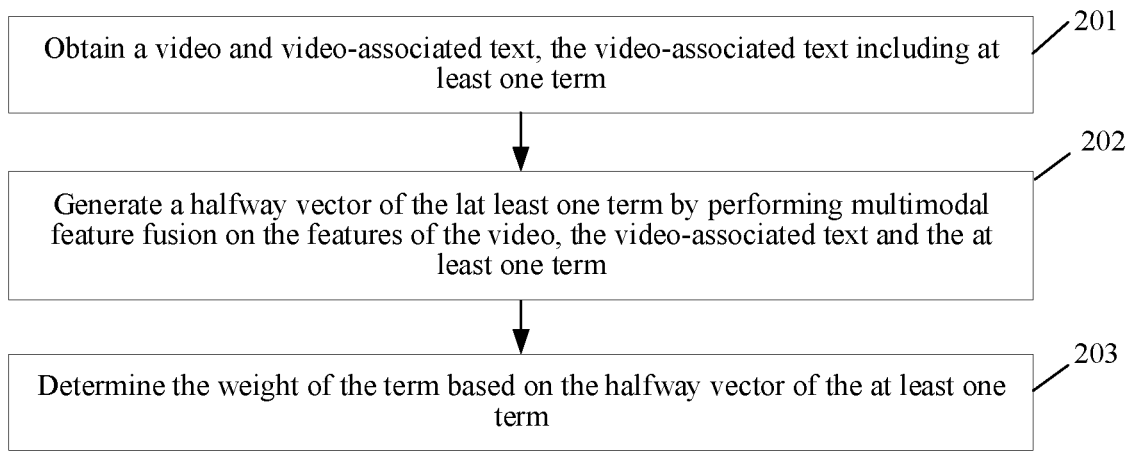
FIG. 2 is a flowchart of a term weight generation method provided by an exemplary embodiment of this application.

The term weight prediction stage is described below:

To improve the accuracy and reliability of the generated term weight, the method as shown in FIG. 2 is used for generating the weight of a term. FIG. 2 shows a flowchart of a term weight generation method provided by an exemplary embodiment of this application. The method is performed by a computer device. As shown in FIG. 2, the method includes:

Step 201: Obtain a video and video-associated text, the video-associated text including at least one term.

There is a corresponding relationship between the video and the video-associated text, specifically, the video-associated text being text information associated with the content of the video. For example, the video-associated text is the title of the video or an introduction of the video. In some embodiments, in the case where term weights between different terms need to be compared, the video-associated text includes at least two terms.

In an embodiment, the video-associated text is a title corresponding to the video, and the video-associated text and the video are independent of each other, where the title is artificially annotated or generated by a machine, and is used for briefly describing the central meaning of the video.

Exemplarily, the content of a video is an introduction to the practice of roast meat, and the title is "Teach you how to roast meat".

In an embodiment, the video-associated text is a video introduction corresponding to the video, and the video-associated text and the video are independent of each other, where the video introduction is artificially written or generated by a machine, and is used for briefly describing the concrete content of the video. Exemplarily, the content of a video is to introduce the practice of roast meat, and the video introduction is "This video introduces the practice of roast meat, including three steps: pretreatment, marinating and roasting".

In some embodiments, the computer device obtains the video and the video-associated text via a local database or content server. The content server is configured to store a large number of videos and video-associated text corresponding to the videos, and push them to a user side for display. For example, the content server is a background server of a video-on-demand application, a short video application, or a song application. The computer device and the content server are the same or different devices.

Step 202: Generate a halfway vector of the at least one term, perform multimodal feature fusion on features of three types of information, (e.g., the video, the video-associated text and the term).

The multimodal feature fusion refers that a computer system performs feature extraction on the video, the video-associated text and the term respectively to obtain a video feature vector, a text feature vector and a term feature vector, and then performs vector fusion operation on the video feature vector, the text feature vector and the term feature vector. Since the video, the video-associated text and the term are information of different modalities, fusion of the features of the video, the video-associated text and the term may be called the multimodal feature fusion.

In some embodiments, the multimodal feature fusion includes the following two steps:

First, extract the video feature vector of the video, extract the text feature vector of the video-associated text, and extract the term feature vector of the term,
  where the video feature vector indicates the video feature information, the text feature vector indicates the feature information of the video-associated text, and the term feature vector indicates the term feature information; and the video feature vector is configured to reflect the feature of the content of the video, the text feature vector is configured to reflect the semantic feature of the text, and the term feature vector is configured to reflect the semantic feature of the term.

Second, fuse the video feature vector, the text feature vector and the term feature vector to obtain the halfway vector of the term,
  where the halfway vector obtained by feature fusion simultaneously contains the feature information of the video, the video-associated text and the term.

Step 203: Generate the weight of the term based on the halfway vector of the term.

In some embodiments, the generating the weight of the term based on the halfway vector of the term includes the following two steps:

First, perform dimension transformation on the halfway vector to obtain a one-dimensional vector.

The computer device may generate the halfway vector of the term by performing the multimodal feature fusion on the features of the video, the video-associated text and the term, where the halfway vector is a multi-dimensional vector containing the feature information of the video, the video-associated text and the term. In an embodiment, the halfway vector is transformed into the one-dimensional vector by fully connected mapping.

Second, normalize the one-dimensional vector to obtain the weight of the term.

In an embodiment, the computer device performs dimension transformation on the halfway vector by the fully connected mapping. For example, if the halfway vector has 388 dimensions, a one-dimensional vector is obtained by performing dimension transformation, where the one-dimensional vector contains the importance information of a term vector in a sentence vector. By normalizing the one-dimensional vector, the one-dimensional vector may be transformed into a number in the interval [0, 1], and the number is the weight of the term. In an embodiment, the computer device may implement normalization on the one-dimensional vector by a threshold function, for example, the one-dimensional vector is transformed in a numerical interval by a sigmoid function, to map the one-dimensional vector to the interval [0, 1] to obtain the term weight. In some embodiments, normalization of the one-dimensional vector may also be implemented by a linear function, e.g., a Min-Max scaling function. The manner of implementing the normalization is not limited in this application.

In summary, by combining the features of the video, the video-associated text and the term, the halfway vector is generated, and based on the halfway vector, the weight of the term is generated. In a video search process, the above term weight generation method is used for pre-extracting the weight of a term, which not only considers the feature of the text dimension, but also incorporates and fuses the feature of the video dimension. The term weight generation based on multi-dimensional features is conducive to improving the accuracy and reliability of the outputted term weight, and improving the distinction between key terms and confusing terms in video-associated text.

Figure 3:
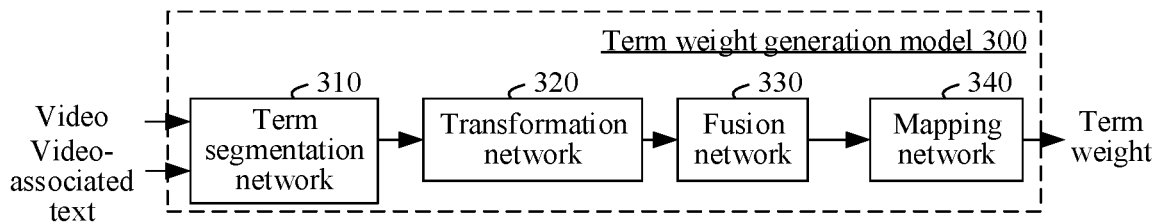
FIG. 3 is a schematic diagram of a term weight generation model provided by an exemplary embodiment of this application.

FIG. 3 shows a schematic diagram of a term weight generation model provided by an exemplary embodiment of this application. The term weight generation model 300 in FIG. 3 includes a term segmentation network 310, a transformation network 320, a fusion network 330 and a mapping network 340, where, the term segmentation network 310 is configured to segment video-associated text to obtain at least one term; the transformation network 320 is configured to transform a video into a video feature vector, transform the video-associated text into a text feature vector, and transform a term into a term feature vector; the fusion network 330 is configured to fuse the video feature vector, the text feature vector and the term feature vector to obtain a halfway vector; and the mapping network 340 is configured to map the halfway vector to the weight of the term corresponding to the halfway vector.

Figure 4:
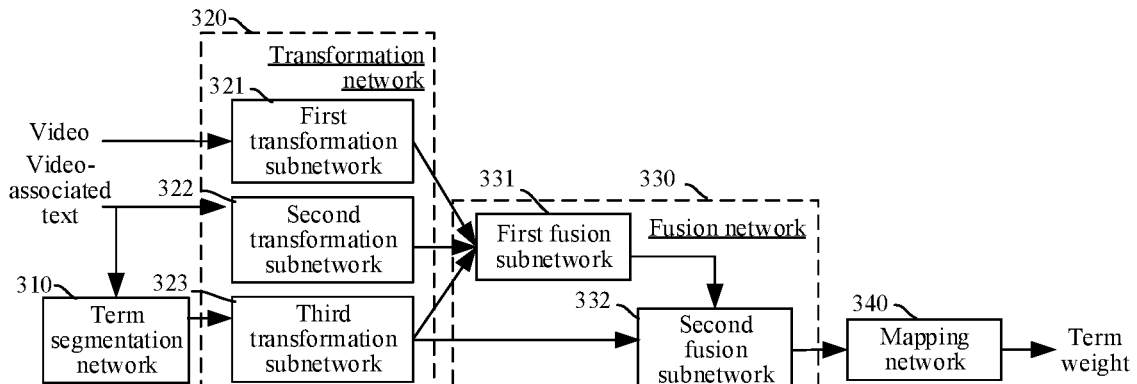
FIG. 4 is a schematic diagram of a term weight generation model provided by another exemplary embodiment of this application.

FIG. 4 shows a schematic diagram of a term weight generation model provided by another exemplary embodiment of this application. The term weight generation model includes a term segmentation network 310, a transformation network 320, a fusion network 330 and a mapping network 340. The transformation network 320 includes a first transformation subnetwork 321, a second transformation subnetwork 322 and a third transformation subnetwork 323. The fusion network 330 includes a first fusion subnetwork 331 and a second fusion subnetwork 332.

Figure 5:
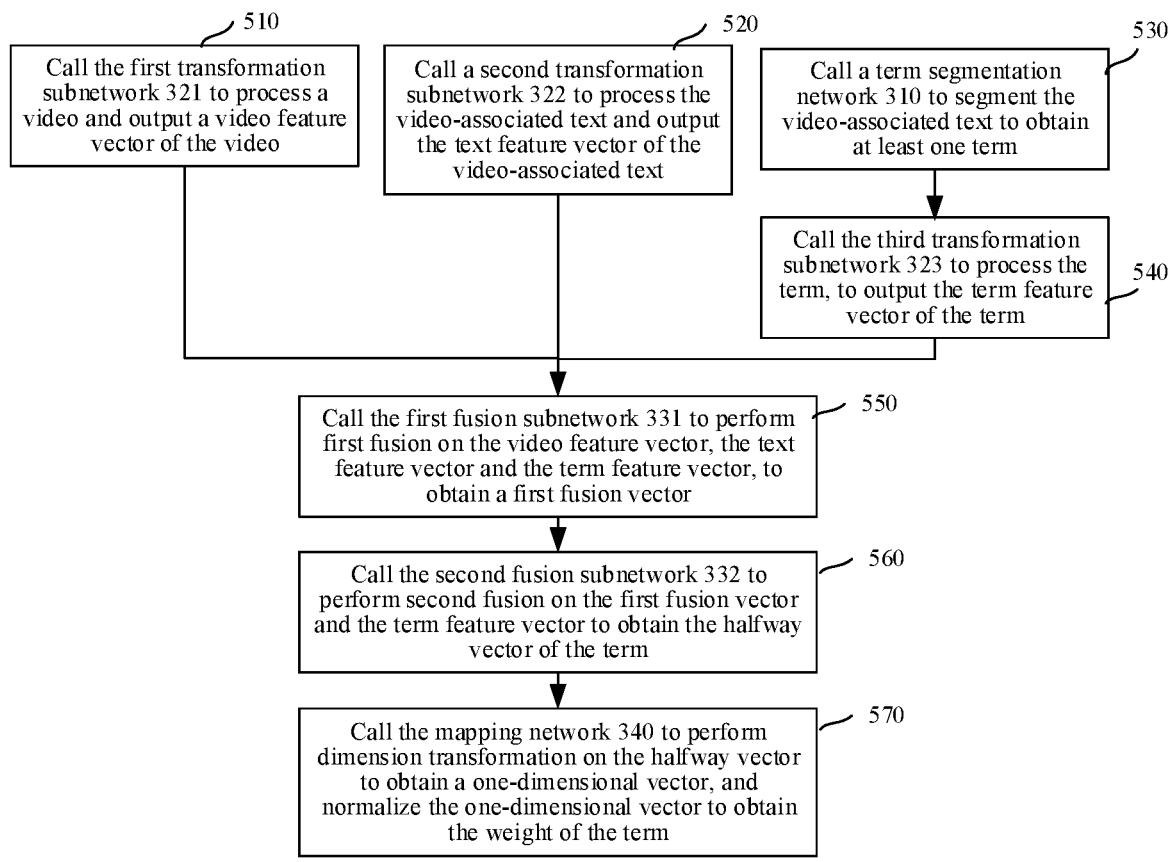
FIG. 5 is a flowchart of a term weight generation method provided by an exemplary embodiment of this application.

FIG. 5 shows a flowchart of a term weight generation method provided by an exemplary embodiment of this application. The method is performed by a computer device.

With reference to the term weight generation model in FIG. 4, the term weight generation method includes:

Step 510: Call the first transformation subnetwork 321 to process a video and output a video feature vector of the video.

Exemplarily, the first transformation subnetwork 321 is configured to perform a framing operation on the video, and the computer device calls the first transformation subnetwork 321 to process the video to obtain at least two video frames of the video. Then, the computer device extracts the video frame vectors of the at least two video frames, compute the average vector of the video frame vectors of the at least two video frames, and determine the average vector as the video feature vector; or, compute a weighted vector of the video frame vectors of the at least two video frames, and determine the weighted vector as the video feature vector.

In some embodiments, the computer device determines a target object included in each video frame by a target detection model, and classifies the target object by a classification model to obtain the target object classification corresponding to each video frame. The target detection model is configured to detect target objects included in the video frame, e.g., people, animals, plants, and different types of objects. The classification model is configured to classify the detected target objects to obtain the target object classification. For example, the detected target object is an area where an animal in the video frame is, and inputting this area into the classification model may obtain the target object as a cat. The target detection model and the classification model are implemented based on Convolutional Neural Networks (CNN). In some embodiments, the target detection model may not only detect target objects in video frames, but also classify the target objects. In this case, the computer device may directly obtain the target object classification by the target detection model.

Then, the computer device computes the similarity score between the target object classification and the term corresponding to each video frame, and determines the weight of the video frame vector of each video frame according to the similarity score corresponding to each video frame, the weight being positively correlated to the similarity score. That is, the higher the similarity score between the target object classification and the term, the higher the weight of the video frame vector of the video frame corresponding to the target object classification. After determining the weight of the video frame vector of each video frame, the computer device computes the weighted vector of the video frame vectors of the at least two video frames according to the video frame vectors of the at least two video frames and the respective weights of the video frame vectors of the at least two video frames, and determines the weighted vector as the video feature vector. By determining the weight of the video frame vector in the above manner, the weight of the video frame vector associated with the term may be improved, so that the video frame associated with the term plays a greater role during determination of the video feature vector. The determined video feature vector may highlight the features that are strongly associated with the term, in the video features, and then improve the accuracy of determination of the video feature vector. In some embodiments, the weights may also be artificially set.

In some embodiments, the framing operation includes at least the following two processing methods:

First, extract a video frame according to a fixed time interval.

Illustratively, assuming that the video duration is 30 s, and a preset sampling duration interval is 0.2 s, the computer device performs the framing operation on the video in a manner of capturing video frames every 0.2 s.

Second, extract video frames according to a preset capturing rule.

In an embodiment, assuming that the video duration is 30 s, it is preset that in the first 20% video duration, video frames are captured every 1 s; in the middle 60% video duration, video frames are captured every 0.2 s; and in the last 20% video duration, video frames are captured every 1 s.

In some embodiments, the computer device extracting the video frame vectors of the at least two video frames includes: call a residual network to extract the video frame vectors of the at least two video frames in the video.

Figure 6:
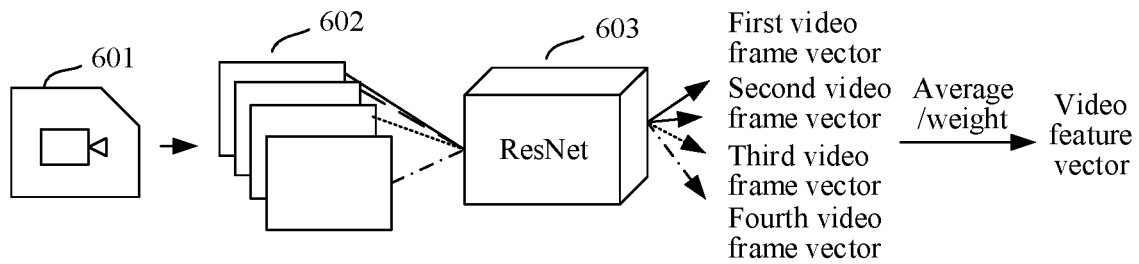
FIG. 6 is a flowchart for generation of a video feature vector provided by an exemplary embodiment of this application.

Illustratively, as shown in FIG. 6, the computer device frames a video 601 to obtain four video frames 602. The four video frames 602 are inputted into a ResNet 603 to obtain a first frame vector, a second frame vector, a third frame vector and a fourth frame vector respectively. The four frame vectors are averaged or weighted to obtain the video frame vector. In an embodiment, the computing the average vector of the video frame vectors of the at least two video frames refers to computing the average of the sum of the first frame vector, the second frame vector, the third frame vector and the fourth frame vector. In an embodiment, the computing the weighted vector of the video frame vectors of the at least two video frames refers to weighting the sum of the first frame vector, the second frame vector, the third frame vector and the fourth frame vector. For example, when the first frame vector is a, the second frame vector is b, the third frame vector is c, and the fourth frame vector is d, assuming that the first frame vector is given a weight of 0.3, the second frame vector is given a weight of 0.1, the third frame vector is given a weight of 0.2, and the fourth frame vector is given a weight of 0.4, the resulting video feature vector is 0.3a+0.1b+0.2c+0.4d.

Step 520: Call a second transformation subnetwork 322 to process the video-associated text and output the text feature vector of the video-associated text.

In an embodiment, the second transformation subnetwork 322 includes a Bidirectional Encoder Representation from Transformers (BERT) network and/or a Long Short-Term Memory (LSTM) network. The computer device calls the BERT network to extract the text feature vector of the video-associated text, or calls the LSTM network to extract the text feature vector of the video-associated text. In some embodiments, the computer device may also extract the text feature vector of the video-associated text by calling the BERT network and the LSTM network respectively. Then, the average or weighted average of the text feature vectors extracted by the two networks is computed to obtain the final text feature vector.

Figure 7:
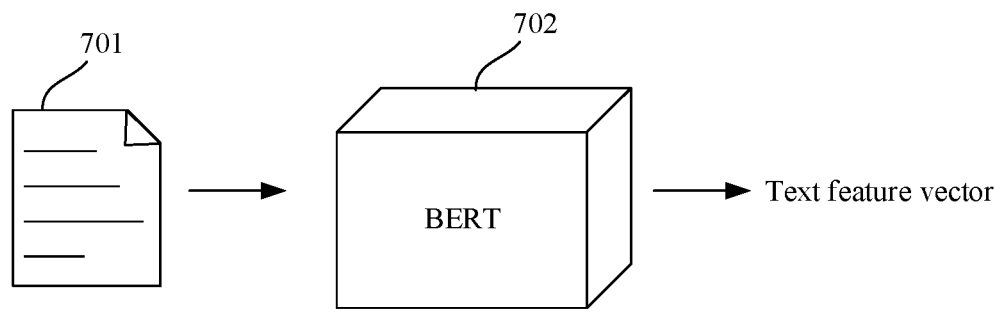
FIG. 7 is a flowchart for generation of a text feature vector provided by an exemplary embodiment of this application.

In some embodiments, as shown in FIG. 7, the video-associated text 701 is inputted into the Bert network 702 to obtain the text feature vector.

Step 530: Call a term segmentation network 310 to segment the video-associated text to obtain terms.

In an embodiment, jieba (a third-party Chinese term segmentation library) is built in the term segmentation network. Jieba supports three term segmentation modes. A precise mode: Sentences are segmented most accurately, there is no redundant data, and the precise mode is suitable for text analysis. A full mode: All the terms in a sentence that may be terms are segmented at a high speed, but there is redundant data. A search engine mode: On the basis of the precise mode, long terms are segmented again. In an actual usage scenario, the mode is selected according to the type, length, etc. of the video-associated text, and finally the video-associated text is transformed into at least one term. The computer device may segment the video-associated text by calling the term segmentation network.

In an embodiment, the video-associated text is "This Luban is helpless, the economy has been suppressed and can't rise at all, here is the mobile phone for you to play!". In the precise mode, the terms obtained by term segmentation include "This", "Luban", "is helpless", "the economy", "has been", "suppressed", "and can't rise", "at all", "here is", "the mobile phone", "for", "you to play" and "!". In the full mode, the terms obtained by term segmentation include "Luban", "helpless", "economy", "suppressed", "at all" and "mobile phone". In the search engine mode, the terms obtained by term segmentation include "This", "Luban", "is", "helpless", "the", "economy", "is", "suppressed", "and", "can't", "rise", "at", "all", "here", "is", "the mobile phone", "for", "you", "to", "play" and "!".

Step 540: Call the third transformation subnetwork 323 to process the term, to output the term feature vector of the term.

Figure 8:
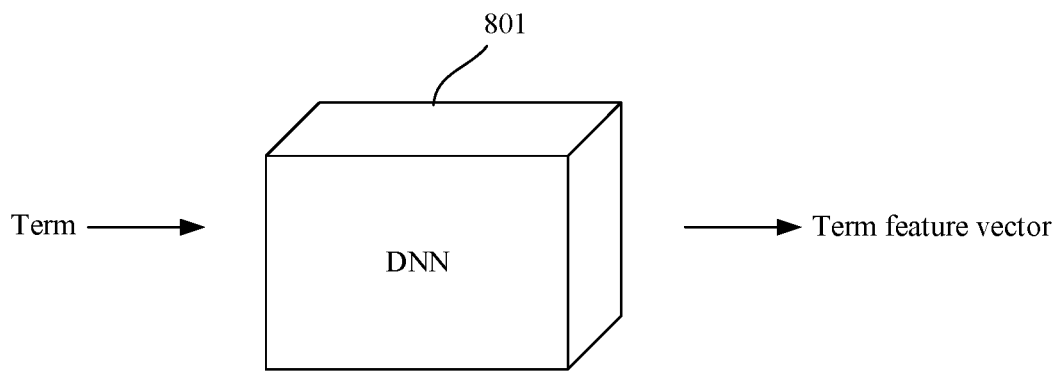
FIG. 8 is a flowchart for generation of a term feature vector provided by an exemplary embodiment of this application.

In an embodiment, the third transformation subnetwork 323 includes a deep neural network. The computer device calls the deep neural network to extract the term feature vector of the term. Illustratively, as shown in FIG. 8, the computer device inputs the term into a DNN 801 to obtain the term vector.

Step 550: Call the first fusion subnetwork 331 to perform a first fusion operation on the video feature vector, the text feature vector and the term feature vector, to obtain a first fusion vector.

In an embodiment, the computer device calls the first fusion subnetwork to sequentially splice the video feature vector, the text feature vector and the term feature vector to obtain a first splicing vector. Then, the computer device performs fully connected feature mapping on the first splicing vector to obtain the first fusion vector.

The splicing refers to dimensional splicing of all vectors. For example, when the original video frame vector has 318 dimensions, the text vector has 50 dimensions, and the term vector has 10 dimensions, the obtained first splicing vector has 378 dimensions. In an embodiment, the fully connected feature mapping refers to mapping the obtained first splicing vector to obtain the first fusion vector. Illustratively, the first splicing vector is [a, b, c], where a, b, c indicate video information, video-associated text information and term information, respectively. The first fusion vector [0.9a, 3b, 10c] is obtained by the fully connected layer mapping, where 0.9a, 3b, 10c respectively indicate the video information, the video-associated text information and the term information, that is, the fully connected feature mapping changes the degree of fusion between the video information, the video-associated text information and the term information. The above examples are merely for explanation. The actual fully connected feature mapping is implemented in a high-dimensional space, and the degree of fusion changes with the changes of the inputted video, video-associated text and terms.

Step 560: Call the second fusion subnetwork 332 to perform a second fusion operation on the first fusion vector and the term feature vector to obtain the halfway vector of the term.

In an embodiment, the computer device calls the second fusion subnetwork 332 to sequentially splice the first fusion vector and the term feature vector to obtain a second splicing vector. Then, the computer device performs fully connected feature mapping on the second splicing vector to obtain the halfway vector of the term. The splicing and fully connected feature mapping are similar to those in the first fusion subnetwork, and are not repeated here. By the splicing via the first fusion subnetwork and the splicing via the second fusion subnetwork, the importance of the current term is strengthened, and the weight of the term feature vector in the halfway vector is improved.

Step 570: Call the mapping network 340 to perform dimension transformation on the halfway vector to obtain a one-dimensional vector, and normalize the one-dimensional vector to obtain the weight of the term.

In an embodiment, dimension transformation is performed on the halfway vector by the fully connected mapping. For example, if the halfway vector has 388 dimensions, a one-dimensional vector is obtained by performing dimension transformation, where the one-dimensional vector contains the importance information of the term feature vector in the text feature vector. By normalizing the one-dimensional vector, the computer device may obtain a value in the interval [0, 1], and the value is the weight of the term. In an embodiment, the computer device transforms (e.g., normalize) the one-dimensional vector in a numerical interval by the sigmoid function, and maps the one-dimensional vector to the interval [0, 1] to obtain the term weight.

To sum up, the method provided in this embodiment obtains the video feature vector, the text feature vector and the term feature vector by performing feature extraction on the video, the video-associated text and the term, then performs splicing and fully connected mapping on the feature vectors of the three modalities to obtain the first fusion vector, then performs splicing and fully connected mapping on the first fusion vector and the term feature vector to obtain the halfway vector, and based on the halfway vector, obtains the weight of the term.

The method provided in this embodiment further increases the information ratio of the current term feature vector in the halfway vector by splicing the term feature vector twice, and is conducive to improving the distinction between the weights of different terms in the video-associated text.

The method provided in this embodiment further fuses the video feature vector, the text feature vector and the term feature vector, which not only considers the feature of the text dimension, but also incorporates and fuses the feature of the video dimension. The term weight generation based on multi-dimensional features is conducive to improving the accuracy and reliability of the outputted term weight, and improving the distinction between key terms and confusing terms in video-associated text.

The method provided in this embodiment further uses the residual network for feature extraction of a video, uses the BERT network or LSTM network for feature extraction of video-associated text and uses the deep neural network for feature extraction of a term, thereby implementing transformation of a natural language into a mathematical operable feature vector, and simplifying mathematical operation of the term weight generation method of this application.

Figure 9:
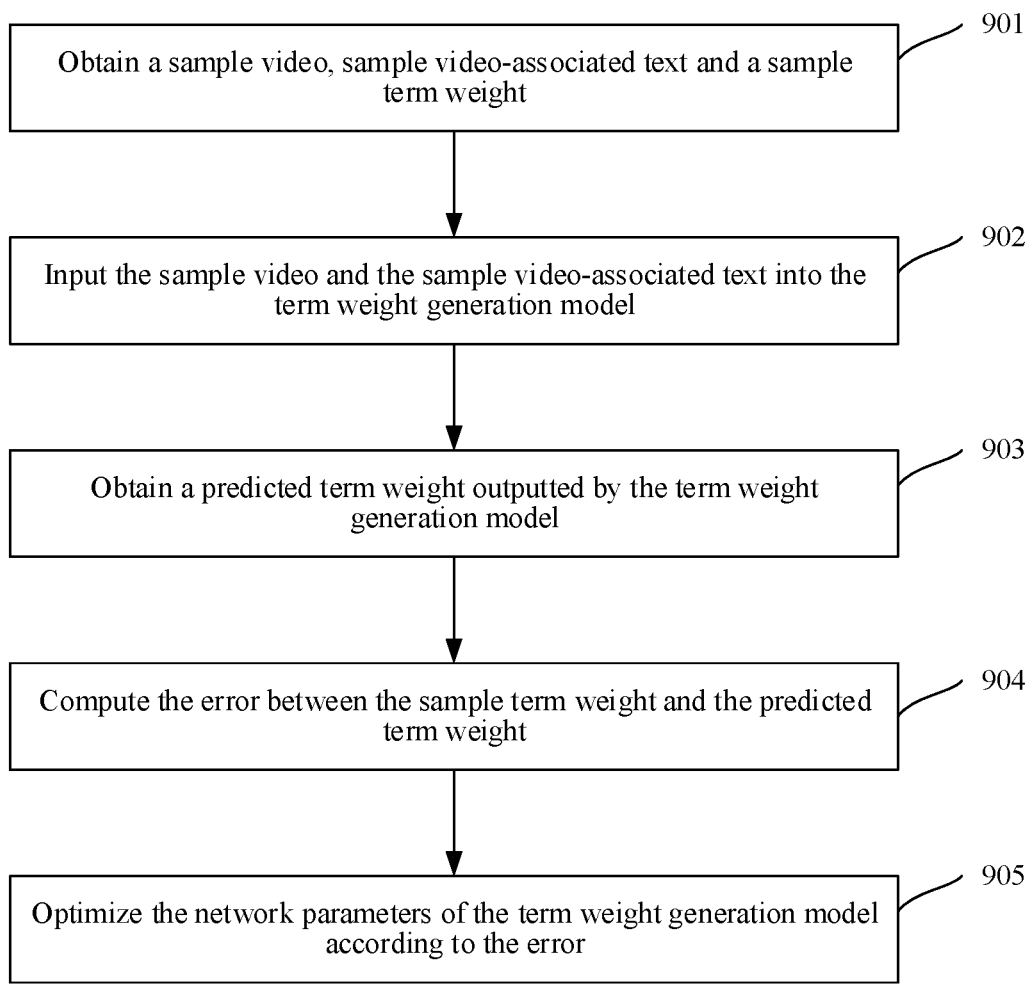
FIG. 9 is a flowchart of a method for training a term weight generation model provided by an exemplary embodiment of this application.

The model training stage is described below:

The above term weight generation model is obtained by training using a training method. FIG. 9 is a flowchart of a method for training the term weight generation model provided by an exemplary embodiment of this application, performed by a computer device, and including:

Step 901: Obtain a sample video, sample video-associated text and a sample term weight.

There is a corresponding relationship between the sample video and the sample video-associated text. The sample video-associated text is text information associated with the content of the sample video. In some embodiments, the sample video-associated text includes at least one term. The sample term weight is obtained by artificially annotating the importance of a term in the sample video-associated text.

Step 902: Input the sample video and the sample video-associated text into the term weight generation model.

Step 903: Obtain a predicted term weight outputted by the term weight generation model.

The predicted term weight refers to the term weight outputted by the term weight generation model after the computer device inputs the sample video and the sample video-associated text into the term weight generation model.

Step 904: Compute the error between the sample term weight and the predicted term weight.

Step 905: Optimize the network parameters of the term weight generation model according to the error.

The network parameters of the term weight generation model are used for adjusting the performance of the term weight generation model. In this application, the network parameters of the term weight generation model include at least the network parameters of the ResNet, the network parameters of the BERT, the network parameters of the DNN, and fusion parameters between the video feature vector, the text feature vector and the term feature vector.

Based on an embodiment in FIG. 2, in step 201, obtaining a video and video-associated text, the video-associated text including at least one term, a video obtaining method includes: obtaining video files in a target video library one by one as target videos to perform subsequent processing.

In an embodiment, the target video is a video clip of a video file stored in a video library, and the target video is extracted by at least one of the following methods:

(1) Divide the video file based on a preset time interval, for example, extract the first two minutes of video clip at the beginning of the video file as the video.

(2) Extract the target video manually.

That is, a video file stored in a video library is extracted artificially. For example, if a viewer considers the video clip from the 5th to the 6th minute in the video file to be the core video of the video file, the viewer extracts the core video as the target video.

(3) Extract the target video by a video extraction model.

That is, a video file stored in a video library is inputted into the video extraction model, and after the video extraction model performs feature extraction on the video file, the correlation between the frames in the video file is analyzed, and then the video file is extracted to obtain the target video.

In an embodiment, the target video is a video file that meets a filtering condition. Illustratively, the target video is a video file uploaded by a specified user, or, the target video is a video file of a required video type, or, a video file whose video duration reaches a threshold.

When the target video is a video file of a required video type, exemplarily, when the video file is a certain episode of a TV series, a movie video, a movie clip, a documentary video, etc., the video file is obtained as a target video.

When the target video is a video file uploaded by a specified user, exemplarily, when the video file is a video uploaded by a professional organization, a video uploaded by a public figure, or a video uploaded by an authoritative person, the video file is obtained as a target video.

Based on the embodiment in FIG. 2, the extracting the video feature vector of the video includes the following steps:

First, extract the video frame vector based on the video frame in the video.

The video includes video frames and audio frames, where the video frames are represented as images. Image features refer to features extracted from the interface performance of the video, where the image features include features corresponding to text content such as topic names, bullet screens and dialogues, as well as features corresponding to the video image frames.

In an embodiment, the computer device uses the ResNet to perform feature extraction on the video frame to obtain the video frame vector, that is, to transform the video frame from the original natural language into a mathematical operable vector.

Second, extract the audio frame vector based on an audio frame in the video.

The audio frame represents sound in the video. In an embodiment, an audio frame matches an image frame, that is, an audio and an image are synchronous, and the audio frame and the image frame are extracted at the same time point. In an embodiment, an audio frame does not match an image frame, that is, an audio and an image are asynchronous, and the audio frame and the image frame are extracted at different time points.

In an embodiment, the computer device uses the Convolutional Neural Network (CNN) to perform feature extraction on the audio frame to obtain the audio frame vector, that is, to transform the audio frame from the original natural language into a mathematical operable vector.

Third, extract a text screen vector based on the text in the video frame.

The text in the video frame refers to the text content related to the target video and involved in the target video. Illustratively, the text in the video frame includes the content of a bullet screen, the content appearing in an image, the content of a dialogue, etc.

In an embodiment, the computer device uses the BERT to perform feature extraction on the text on an image to obtain the text screen vector, that is, to transform the text on an image from the original natural language into a mathematical operable vector.

Fourth, fuse at least two of the video frame vector, the audio frame vector and the text screen vector to obtain the video feature vector.

In an embodiment, at least two of the video frame vector, the audio frame vector and the text screen vector are fused in a weighted manner. Illustratively, when the video frame vector is x, the audio frame vector is y, and the text screen vector is z, assuming that the video frame vector is given a weight of 0.5, the audio frame vector is given a weight of 0.1, and the text screen vector is given a weight of 0.4, the resulting video feature vector is $0.5x+0.1y+0.4z$.

Figure 10:
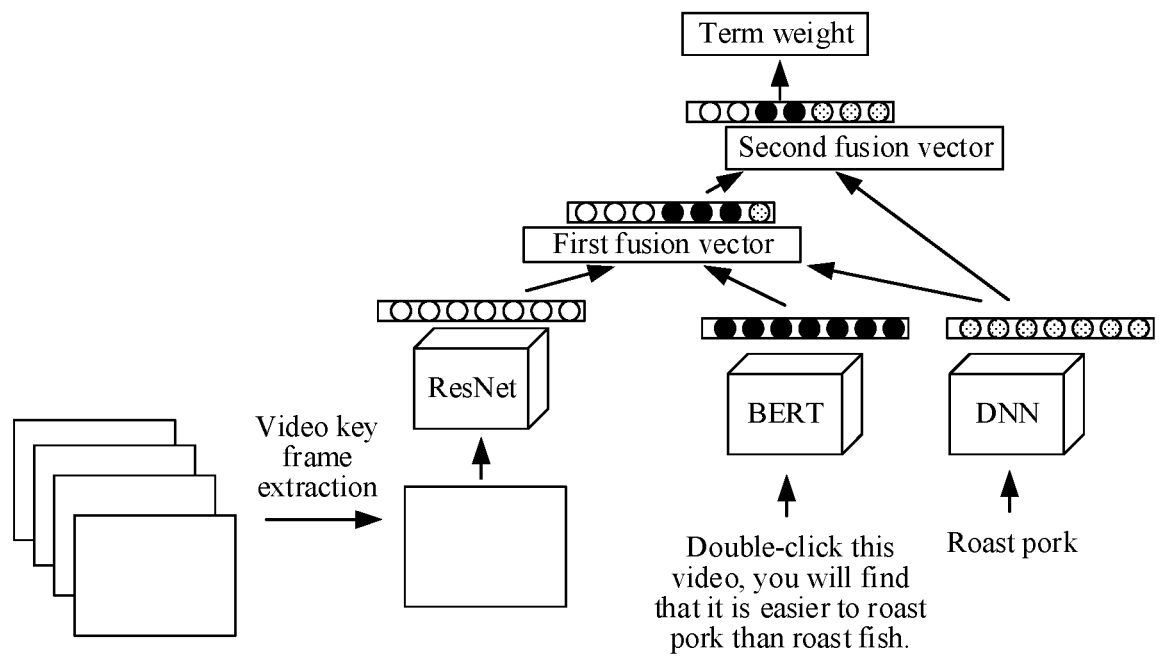
FIG. 10 is a flowchart of a term weight generation method provided by an exemplary embodiment of this application.

FIG. 10 is a flowchart of a term weight generation method provided by an exemplary embodiment of this application. Exemplarily, an inputted sentence "Double-click this video, you will find that it is easier to roast pork than roast fish." may be expressed as text=$[x_0, x_1, \ldots]$, an inputted term is $x_i$, an extracted video key frame is $f_i$, then the encoding vector of the sentence is $V_{text}=BERT(text)$, the encoding vector of the key frame is $V_{img}=ResNet(f_i)$, the encoding vector of the term is $V_{word}=DNN(x_i)$, and the first fusion vector is $Fusion1=fusion(V_{text}, V_{img}, V_{word})$, where fusion is obtained by splicing multiple classes of feature vectors and performing fully connected feature mapping. The input of the second fusion operation is the Fusion1 vector obtained by the first fusion operation and the term vector, and the second fusion vector is $Fusion2=fusion(Fusion1, V_{word})$. The two fusions in the model feature fusion process strengthen the importance of the term, and may effectively identify the importance of the term, e.g., the term weight, in the sentence. In FIG. 10, "○" indicates one-dimensional information of the key frame encoding vector, "●" indicates one-dimensional information of the sentence encoding vector, and "⊚" indicates one-dimensional information of the term encoding vector. The first fusion vector Fusion1 and the second fusion vector Fusion2 use the proportion relationship of the three kinds of circles to represent the degree of fusion of the key frame encoding vector, the sentence encoding vector and the term encoding vector.

The application scenarios involved in this application are introduced:

Taking the method provided by this application applied to a video search scenario as an example for description, a process of implementing video search may include three stages: a model training stage, a preprocessing stage, and a search stage.

Model training stage: A server obtains a sample video, sample video-associated text and the sample term weight, where the sample video-associated text is text information associated with the content of the sample video, and the sample term weight is obtained by artificially annotating the importance of a term in the sample video-associated text. In some embodiments, the server obtains the training samples via a local database or via a content server. After obtaining the training samples, the server inputs the training samples into the term weight generation model to obtain a predicted term weight of the term in the video-associated text predicted by the term weight generation model. Then, the server trains the term weight generation model according to the error between the sample term weight and the predicted term weight. The implementation process of the model training stage may be implemented as a training method of the term weight generation model executed by a computer device, or, implemented as a training apparatus of the term weight generation model.

Preprocessing stage: The server obtains the video and the video-associated text. Exemplarily, the video-associated text includes a video title and/or a video introduction of the video. The video-associated text includes at least one term, the video-associated text is text information associated with the content of the video, and the video-associated text is artificially annotated or generated by a machine. In some embodiments, the server obtains the above information via the local database or via the content server. The above video is to be pushed to a user's client for playback. The server will segment the video-associated text to obtain each term in the video-associated text. The server extracts the video feature vector of the video, the text feature vector of the video-associated text, and the term feature vector of the term in the video-associated text by the term weight generation model trained above, and performs feature fusion on the three feature vectors to generate a halfway vector of the term, where feature fusion refers to performing vector fusion operation on the video feature vector, the text feature vector and the term feature vector. For the specific feature fusion process, refer to the details shown in the embodiment shown in FIG. 5 above. Based on the halfway vector of the term, the server may generate the weight of the term, and then obtain the weight of each term in the video-associated text. Illustratively, the server performs dimension transformation on the halfway vector to obtain a one-dimensional vector, and then transforms the one-dimensional vector by a threshold function to obtain the weight of the term.

Search stage: When a user searches for videos on a client side of a terminal via search terms, the server will receive a video search request sent by the client side. The client is wired or wirelessly connected to the server, the server is a background server of the client, and the video search request includes at least one search term. The server matches the search term with terms in the video-associated text of each video, and determines whether the search term matches the video according to the similarity score obtained by the matching, so as to obtain a matching video. In the process of determining the similarity score, the server uses the term weights obtained in the preprocessing stage. Specifically, the server computes the similarity score between the search term and each term in the video-associated text, computes the average similarity score between the search term and each term according to the weight corresponding to the term, and uses the average similarity score as the similarity score between the search term and the video-associated text. For example, when the search term is x, and the video-associated text includes the terms o, p and q, where the similarity score between x and o is 0.8, the similarity score between x and p is 0.3, the similarity score between x and q is 0.5, the term weight of o is 0.5, the term weight of p is 0.2, and the term weight of q is 0.3, then the similarity score between the search term and the video-associated text determined by the server is 0.8*0.5+0.3*0.2+0.5*0.3=0.61. When the similarity score between the search term and the video-associated text is greater than the similarity score threshold, the server determines the video corresponding to the video-associated text as a matching video. For example, if the similarity score threshold is 0.5, in the case that the search term is x and the video-associated text includes the terms o, p and q, the computer device will determine the video corresponding to the video-associated text as a matching video. In some embodiments, the computer device will first perform a quick pre-retrieval in the videos according to the search term, and after obtaining part of the videos, search the videos in the above manner to improve efficiency. After determining the matching video, the server will send the matching video to the client for playback. The implementation process of the search stage may be implemented as a video search method performed by a computer device (a server or a terminal), or implemented as a video searching apparatus.

It is to be noted that the preprocessing stage is performed before the search stage. Or, the preprocessing stage is interspersed with the search stage, for example, after the server receives the search request, the preprocessing stage and the subsequent steps of the search stage are performed. The above description only takes the method provided by this application applied to a video search scenario as an example for description, and is not intended to limit the application scenario of this application.

Figure 11:
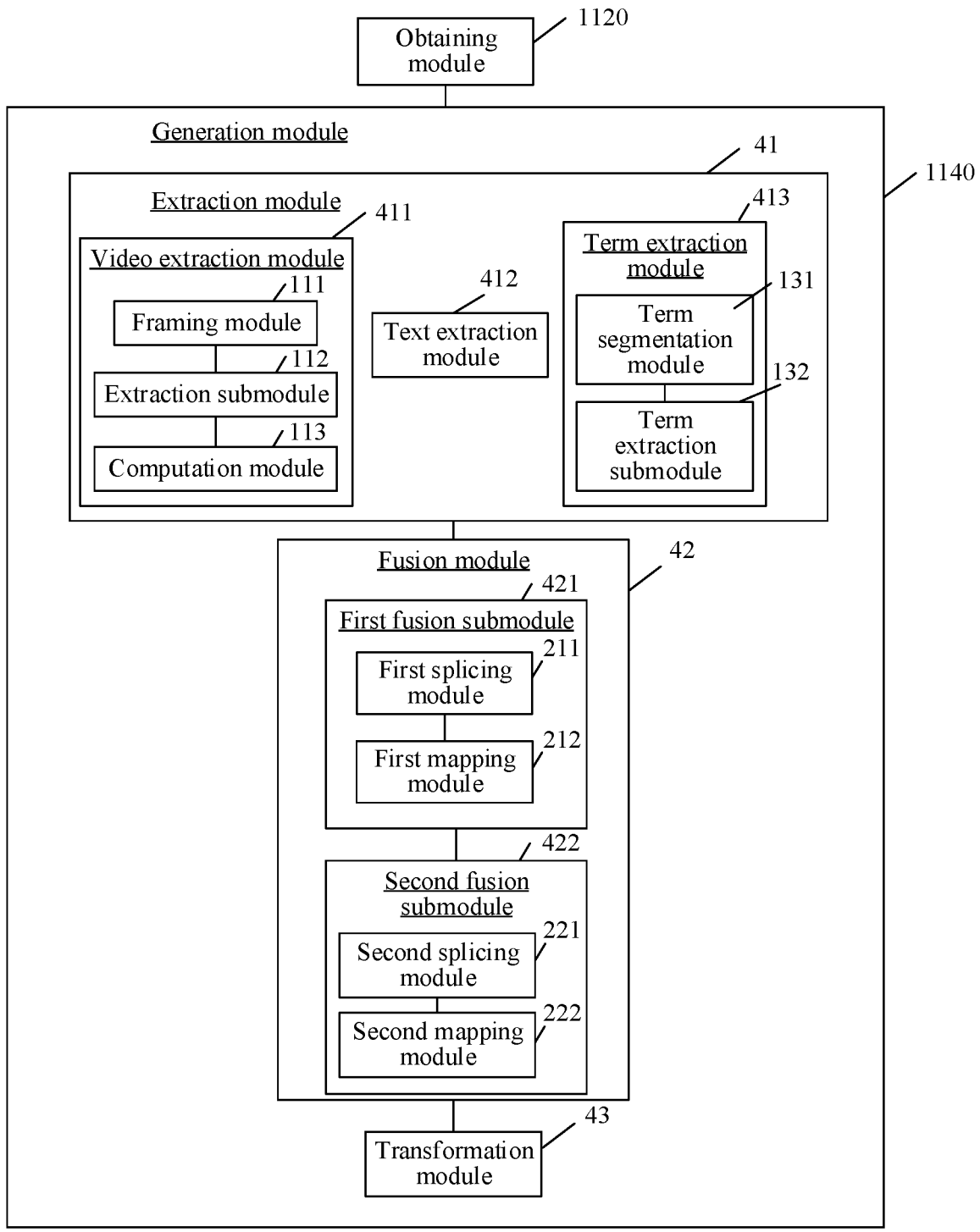
FIG. 11 is a structure diagram of a term weight generation apparatus provided by an exemplary embodiment of this application.

FIG. 11 is a structure diagram of a term weight generation apparatus provided by an exemplary embodiment of this application. As shown in FIG. 11, the apparatus includes:

an obtaining module 1120, configured to obtain a video and video-associated text, the video-associated text including at least one term, and the video-associated text being text information associated with the content of the video; and a generation module 1140, configured to perform multi-modal feature fusion on the features of three types of information, e.g., the video, the video-associated text and the at least one term, to generate a halfway vector of the at least one term;

the generation module 1140 being further configured to generate the weight of the at least one term based on the halfway vector of the at least one term.

In an embodiment, the generation module 1140 includes an extraction module 41 and a fusion module 42.

In an embodiment, the extraction module 41 is configured to extract a video feature vector of the video, extract a text feature vector of the video-associated text, and extract a term feature vector of the at least one term.

In an embodiment, the fusion module 42 is configured to fuse the video feature vector, the text feature vector and the term feature vector to obtain the halfway vector of the at least one term.

In an embodiment, the fusion module 42 includes a first fusion submodule 421 and a second fusion submodule 422.

In an embodiment, the first fusion submodule 421 is configured to perform a first fusion operation on the video feature vector, the text feature vector and the term feature vector to obtain a first fusion vector.

In an embodiment, the second fusion submodule 422 is configured to perform a second fusion operation on the first fusion vector and the term feature vector to obtain the halfway vector of the at least one term.

In an embodiment, the first fusion submodule 421 includes a first splicing module 211 and a first mapping module 212.

In an embodiment, the first splicing module 211 is configured to sequentially splice the video feature vector, the text feature vector and the term feature vector to obtain a first splicing vector.

In an embodiment, the first mapping module 212 is configured to perform fully connected feature mapping on the first splicing vector to obtain the first fusion vector.

In an embodiment, the second fusion submodule 422 includes a second splicing module 221 and a second mapping module 222.

In an embodiment, the second splicing module 221 is configured to sequentially splice the first fusion vector and the term feature vector to obtain a second splicing vector.

In an embodiment, the second mapping module 222 is configured to perform fully connected feature mapping on the second splicing vector to obtain the halfway vector of the at least one term.

In an embodiment, the generation module 1140 further includes a transformation module 43.

In an embodiment, the transformation module 43 is configured to perform dimension transformation on the halfway vector to obtain a one-dimensional vector.

In an embodiment, the transformation module 43 is further configured to normalize the one-dimensional vector to obtain the weight of the at least one term.

In an embodiment, the transformation module 43 is configured to transform the one-dimensional vector by a threshold function to obtain the weight of the at least one term.

In an embodiment, the extraction module includes a video extraction module 411, a text extraction module 412 and a term extraction module 413, the video extraction module 411 including a framing module 111, an extraction submodule 112 and a computation module 113.

In an embodiment, the framing module 111 is configured to perform a framing operation on the video to obtain at least two video frames.

In an embodiment, the extraction submodule 112 is configured to extract video frame vectors of the at least two video frames.

In an embodiment, the computation module 113 is configured to compute the average vector of the video frame vectors of the at least two video frames, and determine the average vector as the video feature vector; or, compute a weighted vector of the video frame vectors of the at least two video frames, and determine the weighted vector as the video feature vector.

In an embodiment, the computation module 113 is configured to:
determine a target object included in each video frame by a target detection model; classify the target object by a classification model to obtain the target object classification corresponding to each video frame; compute the similarity score between the target object classification corresponding to each video frame and the term; determine the weight of the video frame vector of each video frame according to the similarity score corresponding to each video frame, the weight being positively correlated to the similarity score; and compute the weighted vector of the video frame vectors of the at least two video frames according to the video frame vectors of the at least two video frames and the respective weights of the video frame vectors of the at least two video frames, and determine the weighted vector as the video feature vector.

In an embodiment, the extraction submodule 112 is further configured to call a residual network to extract the video frame vectors of the at least two video frames in the video.

In an embodiment, the text extraction module 412 is configured to call a bidirectional encoder representation from transformers (BERT) network to extract the text feature vector of the video-associated text, or call a long short-term memory (LSTM) network to extract the text feature vector of the video-associated text.

In an embodiment, the term extraction module 413 includes a term segmentation module 131 and a term extraction submodule 132.

In an embodiment, the term segmentation module 131 is configured to segment the video-associated text to obtain terms.

In an embodiment, the term extraction submodule 132 is configured to call a deep neural network to extract the term feature vector of the at least one term.

In an embodiment, the term segmentation module 131 is further configured to call a Chinese term segmentation tool to segment the video-associated text to obtain terms.

In an embodiment, the extraction module 41 is configured to:
extract the video frame vector based on the video frame in the video; extract an audio frame vector based on an audio frame in the video; extract a text screen vector based on the text in the video frame; and fuse at least two of the video frame vector, the audio frame vector and the text screen vector to obtain the video feature vector.

To sum up, the apparatus obtains the video feature vector, the text feature vector and the term feature vector by performing feature extraction on the video, the video-associated text and the at least one term, then performs splicing and fully connected mapping on the feature vectors of the three modalities to obtain the first fusion vector, then performs splicing and fully connected mapping on the first fusion vector and the term feature vector to obtain the halfway vector, and based on the halfway vector, obtains the weight of the at least one term.

The apparatus increases the information ratio of the current term feature vector in the halfway vector by splicing the term feature vector twice, and is conducive to improving the distinction between the weights of different terms in the video-associated text.

By the apparatus, in a video search process, the above term weight generation method is used for pre-extracting the weight of a term, which not only considers the feature of the text dimension, but also incorporates and fuses the feature of the video dimension. The term weight generation based on multi-dimensional features is conducive to improving the accuracy and reliability of the outputted term weight, and improving the distinction between key terms and confusing terms in video-associated text.

The apparatus further uses the residual network for feature extraction of a video, uses the BERT network or LSTM network for feature extraction of video-associated text and uses the deep neural network for feature extraction of a term, thereby implementing transformation of a natural language into a mathematical operable feature vector, and simplifying mathematical operation of the term weight generation method of this application.

The embodiments of this application further provide a computer device, including: a processor and a memory, the storage storing at least one instruction, at least one program, a code set, or an instruction set, the at least one instruction, the at least one program, the code set, or the instruction set being loaded and executed by the processor to implement the term weight generation method provided in the above method embodiments.

Figure 12:
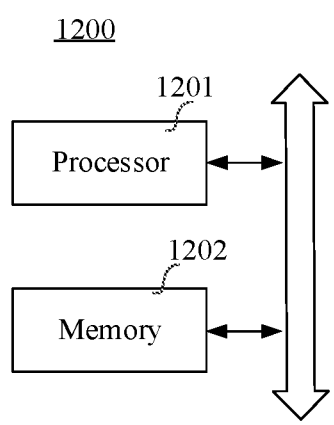
FIG. 12 is a structural block diagram of a computer device according to an exemplary embodiment of this application.

FIG. 12 is a structural block diagram of a computer device 1200 according to an exemplary embodiment of this application. The computer device 1200 may be a portable mobile terminal, such as: a smartphone, a tablet computer, a moving picture experts group audio layer III (MP3) player, a moving picture experts group audio layer IV (MP4) player, a notebook computer, or a desktop computer. The computer device 1200 may be further referred to as another name such as user equipment, a portable terminal, a laptop terminal, or a desktop terminal. The computer device 1200 may further refer to a server.

Generally, the computer device 1200 includes: a processor 1201 and a memory 1202.

The processor 1201 may include one or more processing cores, such as, a 4-core processor or an 8-core processor. The processor 1201 may be implemented by using at least one hardware form of a digital signal processor (DSP), a field-programmable gate array (FPGA), and a programmable logic array (PLA). The processor 1201 may further include a main processor and a coprocessor. The main processor is a processor configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw the displayed content. In some embodiments, the processor 1201 may further include an artificial intelligence (AI) processor. The AI processor is configured to process a computing operation related to machine learning.

The memory 1202 may include one or more computer-readable storage media that may be non-transitory. The memory 1202 may further include a high-speed random access memory (RAM), and a non-volatile memory such as one or more magnetic disk storage devices or flash storage devices. In some embodiments, the non-transitory computer-readable storage medium in the memory 1202 is configured to store at least one instruction, and the at least one instruction is configured to be executed by the processor 1201 to implement the term weight generation method provided in the method embodiments of this application.

The memory further includes one or more programs. The one or more programs are stored in the memory, and the one or more programs include instructions used for performing the term weight generation method provided in the embodiments of this application.

This application further provides a computer-readable storage medium, storing at least one instruction, at least one program, a code set or an instruction set, and the at least one instruction, the at least one program, the code set or the instruction set being loaded and executed by a processor to implement the term weight generation method provided in the foregoing method embodiments.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

This application provides a computer program product or a computer program, including computer instructions, and the computer instructions being stored in a computer-readable storage medium. A processor of a computer device reads the computer instructions from the computer-readable storage medium, and executes the computer instructions, causing the computer device to implement the term weight generation method provided in the foregoing method embodiments.

What is claimed is:

1. A term weight generation method performed by a computer device, comprising:
    obtaining a video and video-associated text, the video-associated text comprising at least one term, and the video-associated text being text information associated with the content of the video;
    generating a halfway vector of the at least one term by performing multimodal feature fusion on features of the video, the video-associated text and the at least one term by:
        extracting a video feature vector of the video;
        extracting a text feature vector of the video-associated text;
        segmenting the video-associated text to obtain a plurality of terms, the plurality of terms including the at least one term;
        extracting, using a deep neural network, a term feature vector of the at least one term; and
        fusing the video feature vector, the text feature vector and the term feature vector into the halfway vector of the at least one term;
    generating a weight of the at least one term based on dimension transformation of the halfway vector of the at least one term into a one-dimension parameter to enhance representation of the at least one term for content of the video and the video-associated text;
    calculating a similarity score between the at least one term and a search term in a video search request submitted by a terminal according to the weight of the at least one term; and
    returning the video to the requesting terminal when the similarity score is greater than a predefined threshold.

2. The method according to claim 1, wherein fusing the video feature vector, the text feature vector and the term feature vector to obtain the halfway vector of the at least one term comprises:
   performing a first fusion operation on the video feature vector, the text feature vector and the term feature vector to obtain a first fusion vector; and
   performing a second fusion operation on the first fusion vector and the term feature vector to obtain the halfway vector of the at least one term.

3. The method according to claim 2, wherein performing the first fusion operation on the video feature vector, the text feature vector and the term feature vector to obtain a first fusion vector comprises:
   sequentially splicing the video feature vector, the text feature vector and the term feature vector to obtain a first splicing vector; and
   performing fully connected feature mapping on the first splicing vector to obtain the first fusion vector.

4. The method according to claim 2, wherein performing the second fusion operation on the first fusion vector and the term feature vector to obtain the halfway vector of the at least one term comprises:
   sequentially splicing the first fusion vector and the term feature vector to obtain a second splicing vector; and
   performing fully connected feature mapping on the second splicing vector to obtain the halfway vector of the at least one term.

5. The method according to claim 1, wherein the weight of the at least one term is obtained by normalizing the one-dimension parameter into a value between zero and 1 using a threshold function.

6. The method according to claim 1, wherein extracting the video feature vector of the video comprises:
   performing a framing operation on the video to obtain at least two video frames;
   extracting video frame vectors of the at least two video frames; and
   computing an average vector of the video frame vectors of the at least two video frames, or computing a weighted vector of the video frame vectors of the at least two video frames; and
   setting the average vector or the weighted vector as the video feature vector.

7. The method according to claim 6, wherein computing the weighted vector of the video frame vectors of the at least two video frames, and setting the weighted vector as the video feature vector comprises:
   determining, using a target detection model, a target object included in one or more video frames;
   classifying, using a classification model, the target object to obtain the target object classification corresponding to the one or more video frames;
   computing a similarity score between the target object classification and a respective term of each video frame;
   determining a weight of the video frame vector of each video frame according to the similarity score corresponding to each video frame, wherein the weight is positively correlated to the similarity score; and
   computing the weighted vector of the video frame vectors of the at least two video frames based on the video frame vectors of the at least two video frames and the respective weights of the video frame vectors of the at least two video frames, and
   setting the weighted vector as the video feature vector.

8. The method according to claim 6, wherein extracting the video frame vectors of the at least two video frames comprises:
   using a residual network to extract the video frame vectors of the at least two video frames in the video.

9. The method according to claim 6, wherein extracting the video feature vector of the video comprises:
   extracting a video frame vector based on the video frame in the video;
   extracting an audio frame vector based on an audio frame in the video;
   extracting a text screen vector based on text in the video frame; and
   fusing at least two of the video frame vector, the audio frame vector, and the text screen vector to obtain the video feature vector.

10. The method according to claim 1, wherein extracting the text feature vector of the video-associated text comprises:
    using a bidirectional encoder representation from transformers (BERT) network or a long short-term memory (LSTM) network to extract the text feature vector of the video-associated text.

11. The method according to claim 1, wherein segmenting the video-associated text to obtain the plurality of terms comprises:
    segmenting, using a Chinese term segmentation tool, the video-associated text to obtain the plurality of terms.

12. An electronic device, comprising:
    one or more processors; and
    memory storing one or more programs, the one or more programs comprising instructions that, when executed by the one or more processors, cause the one or more processors to perform operations comprising:
    obtaining a video and video-associated text, the video-associated text comprising at least one term, and the video-associated text being text information associated with the content of the video;
    generating a halfway vector of the at least one term by performing multimodal feature fusion on features of the video, the video-associated text and the at least one term by:
      extracting a video feature vector of the video;
      extracting a text feature vector of the video-associated text;
      segmenting the video-associated text to obtain a plurality of terms, the plurality of terms including the at least one term;
      extracting, using a deep neural network, a term feature vector of the at least one term; and
      fusing the video feature vector, the text feature vector and the term feature vector into the halfway vector of the at least one term;
    generating a weight of the at least one term based on dimension transformation of the halfway vector of the at least one term into a one-dimension parameter to enhance representation of the at least one term for content of the video and the video-associated text;
    calculating a similarity score between the at least one term and a search term in a video search request submitted by a terminal according to the weight of the at least one term; and
    returning the video to the requesting terminal when the similarity score is greater than a predefined threshold.

13. The electronic device according to claim 12, wherein fusing the video feature vector, the text feature vector and the term feature vector to obtain the halfway vector of the at least one term comprises:
- performing a first fusion operation on the video feature vector, the text feature vector and the term feature vector to obtain a first fusion vector; and
- performing a second fusion operation on the first fusion vector and the term feature vector to obtain the halfway vector of the at least one term.

14. The electronic device according to claim 13, wherein performing the first fusion operation on the video feature vector, the text feature vector and the term feature vector to obtain a first fusion vector comprises:
- sequentially splicing the video feature vector, the text feature vector and the term feature vector to obtain a first splicing vector; and
- performing fully connected feature mapping on the first splicing vector to obtain the first fusion vector.

15. The electronic device according to claim 12, wherein fusing the video feature vector, the text feature vector and the term feature vector to obtain the halfway vector of the at least one term comprises:
- performing a first fusion operation on the video feature vector, the text feature vector and the term feature vector to obtain a first fusion vector; and
- performing a second fusion operation on the first fusion vector and the term feature vector to obtain the halfway vector of the at least one term.

16. The electronic device according to claim 12, wherein the weight of the at least one term is obtained by normalizing the one-dimension parameter into a value between zero and 1 using a threshold function.

17. A non-transitory computer-readable storage medium, storing a computer program, the computer program, when executed by one or more processors of an electronic device, cause the one or more processors to perform operations comprising:
- obtaining a video and video-associated text, the video-associated text comprising at least one term, and the video-associated text being text information associated with the content of the video;
- generating a halfway vector of the at least one term by performing multimodal feature fusion on features of the video, the video-associated text and the at least one term by:
  - extracting a video feature vector of the video;
  - extracting a text feature vector of the video-associated text;
  - segmenting the video-associated text to obtain a plurality of terms, the plurality of terms including the at least one term;
  - extracting, using a deep neural network, a term feature vector of the at least one term; and
  - fusing the video feature vector, the text feature vector and the term feature vector into the halfway vector of the at least one term;
- generating a weight of the at least one term based on dimension transformation of the halfway vector of the at least one term into a one-dimension parameter to enhance representation of the at least one term for content of the video and the video-associated text;
- calculating a similarity score between the at least one term and a search term in a video search request submitted by a terminal according to the weight of the at least one term; and
- returning the video to the requesting terminal when the similarity score is greater than a predefined threshold.

18. The non-transitory computer-readable storage medium according to claim 17, wherein fusing the video feature vector, the text feature vector and the term feature vector to obtain the halfway vector of the at least one term comprises:
- performing a first fusion operation on the video feature vector, the text feature vector and the term feature vector to obtain a first fusion vector; and
- performing a second fusion operation on the first fusion vector and the term feature vector to obtain the halfway vector of the at least one term.

19. The non-transitory computer-readable storage medium according to claim 17, wherein the weight of the at least one term is obtained by normalizing the one-dimension parameter into a value between zero and 1 using a threshold function.

* * * * *